United States Patent [19]

Mullis

[11] Patent Number: 4,498,320
[45] Date of Patent: Feb. 12, 1985

[54] APPARATUS FOR LOCKING A CONTROL DEVICE

[75] Inventor: Jerry D. Mullis, Matthews, N.C.

[73] Assignee: Conbraco Industries, Inc., Matthews, N.C.

[21] Appl. No.: 298,659

[22] Filed: Sep. 2, 1981

[51] Int. Cl.³ ............................................. F16K 35/00
[52] U.S. Cl. ...................................... 70/177; 70/180; 70/212
[58] Field of Search ................. 70/175, 176, 177, 180, 70/202, 203, 211, 212; 137/385

[56] References Cited

U.S. PATENT DOCUMENTS

| | | | |
|---|---|---|---|
| 201,146 | 3/1878 | Adler | 70/114 |
| 1,181,977 | 5/1916 | Hart | 70/114 |
| 1,434,513 | 11/1922 | Voight | 70/114 |
| 2,787,154 | 4/1957 | Wesberry | 70/118 |
| 3,527,069 | 9/1970 | Tumbialo | 70/114 |
| 3,771,339 | 11/1973 | Smith | 70/118 |
| 3,865,130 | 2/1975 | Mullis | 137/385 |
| 3,960,168 | 6/1976 | Plympton | 137/385 |
| 3,976,095 | 8/1976 | Koch | 137/385 |
| 4,126,023 | 11/1978 | Smith | 70/177 |
| 4,162,690 | 7/1979 | Anderson | 137/385 |
| 4,208,033 | 6/1980 | Kesterman | 137/385 |

Primary Examiner—Robert L. Wolfe
Attorney, Agent, or Firm—Richards, Shefte & Pinckney

[57] ABSTRACT

A locking device for a control valve having a valve body and an operating handle rotatably shiftable between two positions, including a base member mountable on the valve for swinging movement co-axially with the handle and a locking member mounted on the base member for dependent swinging movement therewith and independent pivotal movement relative thereto and normal with respect to the swinging axis. The base and locking members each have opposed shoulders disposed for abutment with respective opposite sides of the handle and the locking member has a depending leg disposed to engage the valve body. Pivotal movement of the locking member permits selective swinging of the device. Upon abutment of the appropriate shoulders of the device against the side of the handle intermediate its two positions, the locking member is pivoted downwardly onto the base member to simultaneously engage the valve body with the depending leg, thereby to lock the handle against rotation.

22 Claims, 5 Drawing Figures

APPARATUS FOR LOCKING A CONTROL DEVICE

BACKGROUND OF THE INVENTION

The present invention relates to control devices of the type employing a shiftable operating handle, e.g., flow control valves used in fluid flow systems, and particularly to locking devices therefor adapted to permit selective locking of such a control device at one or more positions of its handle.

In typical conventional fluid flow systems, the selected operating position of a particular regulatory valve thereof may be essential to the proper operation and functioning of the system and the improper operation or positioning of the valve may result in the total malfunctioning of the system with attendant serious, costly and often dangerous consequences. Accordingly, it is desirable that control valves be provided with some manner of locking thereof to prevent inadvertent or accidental movement of the operating handle thereof as well as intentional tampering with the handle.

A variety of lockable valves and locking devices for control valves have heretofore been proposed, examples being U.S. Pat. Nos. 1,038,308; 2,324,633; 3,156,256; 3,865,130; 3,960,168; 3,976,095; 3,980,099; 4,126,023; 4,162,690; 4,208,033; and 4,208,893. While each of these devices performs relatively satisfactorily for its intended purpose, each device suffers from one or more disadvantages. Thus, each such device is specifically designed for one particular valve or valve type, characteristically requiring either a special valve construction or the modification of one or more of the valve body, handle, and stem components in order to facilitate the proper operation of the device, and, accordingly, cannot be adapted for operation on other valves. Additionally, most, if not all, of these devices are relatively complex and are difficult and expensive to manufacture. Furthermore, certain of these devices do not prevent access to the valve stem and the nut thereon by which the valve handle is mounted thereto, whereby the effectiveness of the valve can be easily circumvented by removal or loosening of the valve handle and operation of the valve stem by another means, such as an ordinary pair of pliers.

In contrast to the above, the present invention provides a locking device of a relatively simple and inexpensive construction which may be virtually universally adapted for mounting and operation on almost all conventional control valves of the type utilizing a shiftable valve handle, and is capable of preventing access to the valve stem and nut assembly of such valves for circumvention of the intended locking function.

SUMMARY OF THE INVENTION

The apparatus of the present invention is basically adapted for locking a control device of the type having a body and an operating handle mounted thereon for selective shifting between a first and a second position. Briefly described, the locking apparatus includes a movable engagement arrangement adapted to be movably mounted on the control device for selective disposition both when the handle is in its first position and when the handle is in its second position in simultaneous engagement of the body and the handle to restrain the handle from movement and for selective disengagement in both said positions from at least one of said body and said handle to permit shifting of said handle. For this purpose, the movable engagement arrangement has a shoulder arrangement for selective disposition between said first and second position of said handle and in abutment with the handle between its first and second positions, a leg arrangement operatively arranged relative to the shoulder arrangement for engaging the body of the control device, when the shoulder arrangement is disposed between the first and second positions of the handle and is in abutment therewith, and a mechanism for permitting selective movement of at least one of the shoulder and leg arrangements generally normal with respect to the shifting movement of the handle for selective positioning of the shoulder and leg arrangements for simultaneous abutment of the handle with the shoulder arrangement and to engage the body with the leg arrangement to prevent movement of the handle and for selective disengaging of at least one of the shoulder and leg arrangements from the handle and the body, respectively, to permit shifting of the handle.

The preferred embodiment of the locking apparatus of the present invention is principally adapted for use with control devices in which the handle is rotatable, and includes a base member adapted to be movably mounted on the body for independent swinging movement about the axis of rotation of the handle and a locking member mounted on the base member for dependent swinging movement therewith on the body and independent pivotal movement relative thereto and generally normal with respect to the shifting movement of the handle. The shoulder arrangement includes a pair of shoulder surfaces arranged on either one of the base or locking members, preferably both, in spaced relation to abut respective opposite sides of the handle upon swinging movement of the base member. The leg arrangement includes a pair of engagement surfaces arranged on respective opposite sides thereof, each engagement surface being operatively associated with a respective shoulder surface for engagement of the body upon abutment by the respective shoulder surface with its respective side of the handle. The handle preferably is rotatable through an arcuate range extending on one side of the body, each engagement surface of the leg arrangement being disposed to face in the arcuate direction in which the handle is rotatable from the position thereof in which the engagement surface is adapted to lock the handle and each engagement surface being arranged relative to its respective shoulder surface for engagement of the body on the other side thereof when the respective shoulder surface is in abutment with its respective side of the handle.

The locking member has the leg arrangement located thereon to move by pivotal movement of the locking member between a locking position in which the leg arrangement is disposed for engagement of the body and a swinging position spaced from the locking position out of disposition for engagement of the body. To facilitate the aforesaid pivotal movement of the locking member with respect to the base member without disengagement therebetween, the base member includes a first slot arrangement and the locking member includes an arm extending through the first slot arrangement. The base member also includes a second slot arrangement, the arm of the locking member having a reverse bend therein adapted for extension through the second slot arrangement upon pivotal movement of the locking member to dispose its leg arrangement in the aforesaid locking position. The reverse bend includes an aperture therein for receiving any appropriate displacable projection, e.g., a conventional padlock or the like, to selectively prevent relative pivotal movement of the locking member out of locking position with respect to the base member.

DESCRIPTION OF PREFERRED EMBODIMENT

Referring now in greater detail to the accompanying drawings, the locking apparatus of the present invention is illustrated as embodied in a conventional ball-type flow control valve, indicated generally at 10, which is considered and is to be understood to be merely representative of a large variety of conventional fluid flow control valves having handle operated valve members to which the locking apparatus of the present invention may be adapted, the valve 10 being illustrated and described herein solely for the purpose of facilitating an enabling description and a full understanding of the locking apparatus of the present invention. The present invention is not limited to valves or other control devices of this or any other particular construction or type.

Figure 1:
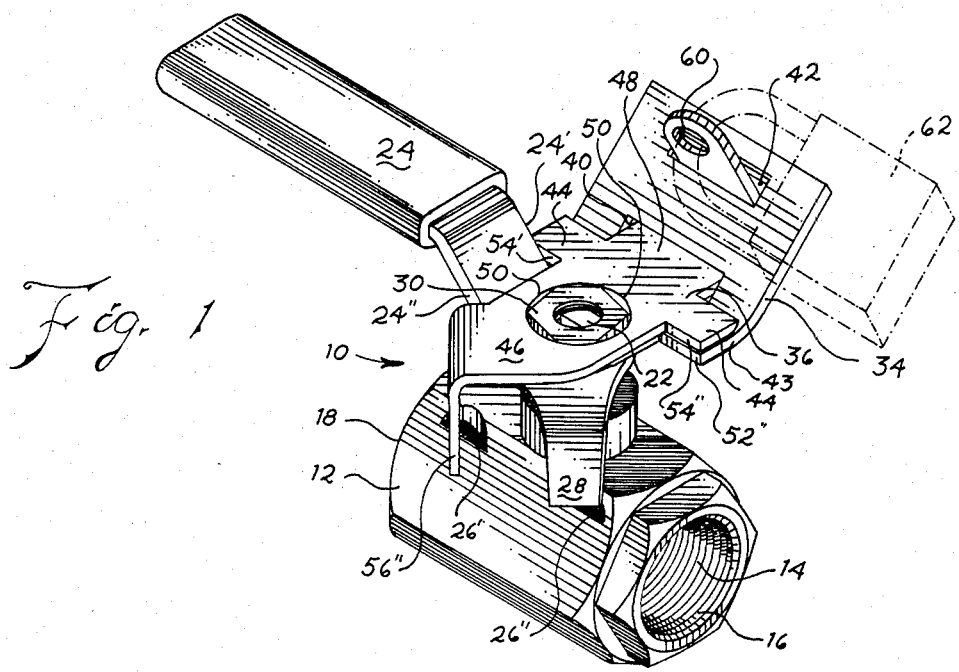
FIG. 1 is a perspective view of a conventional ball type flow control valve on which is mounted and selectively positioned the locking apparatus of the present invention to secure the valve in one position of the handle thereof.
Figure 2:
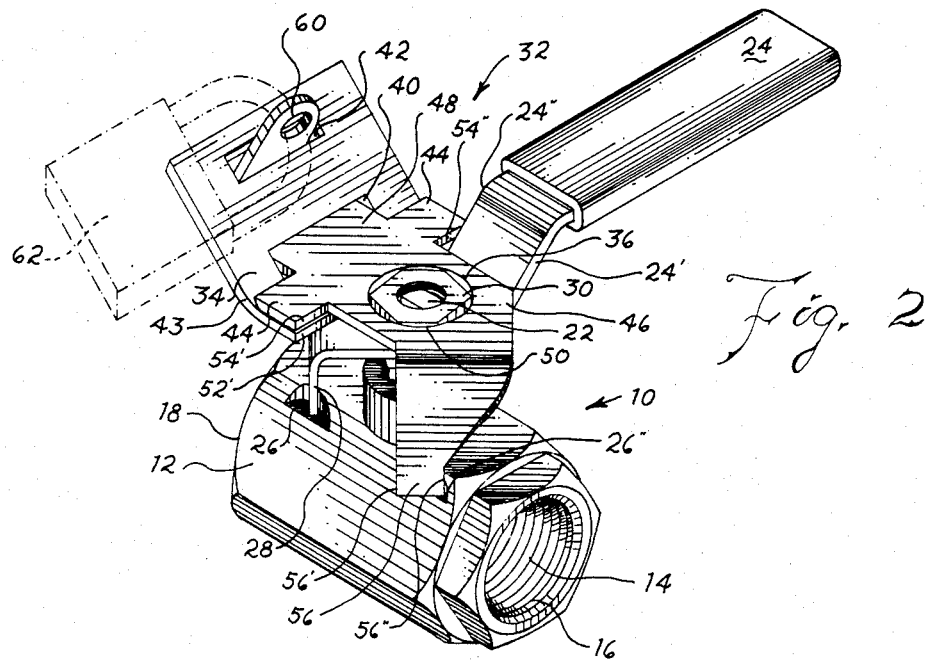
FIG. 2 is another perspective view of the valve and locking apparatus of FIG. 1 illustrating same secured in another position thereof.

The valve 10 includes a valve casing or body 12 having a circular bore 14 extending centrally therethrough from a threaded inlet 16 to a threaded outlet 18 and a ball valve member 20 rotatably disposed in the bore 14 intermediate the inlet 16 and the outlet 18 for rotation between a first open disposition providing fluid communication between the inlet 16 and the outlet 18 and a second closed disposition at which such communication is prevented. Rigidly affixed to the ball valve member 20 is an operating stem or shaft 22 which extends outwardly therefrom through the valve body 12 for rotation with the ball valve member 20. An operating handle 24 is mounted on and extends radially from the stem 22 for actuating the rotational movement of the stem 22 and the ball valve member 20. To facilitate the quick and easy positioning of the ball valve member 20 in its open and closed dispositions, the valve body 12 includes two indentations 26′,26″ formed in the valve body 12 on one exterior side thereof and spaced along the length thereof on opposite sides of the stem 22 and the handle 24 has a depending leg 28 adapted to engage in the indentations 26′, 26″ upon rotational movement of the handle 24 to restrict movement of the handle 24 to rotational shifting between such indentations 26′,26″, the indentations 26′,26″ and the leg 28 being cooperatively positioned and located relative to the ball valve member 20 such that the ball valve member 20 is properly positioned in its open and closed positions when the leg 28 is engaged in respective ones of the indentations 26. Thus, the handle 24 is rotatably shiftable through a ninety degree range of arcuate movement extending on one side of the valve body 12 between the position thereof of FIG. 1 wherein the ball valve member 20 is in its open disposition and the position of FIG. 2 wherein the ball valve member 20 is in its closed disposition.

Figure 3:
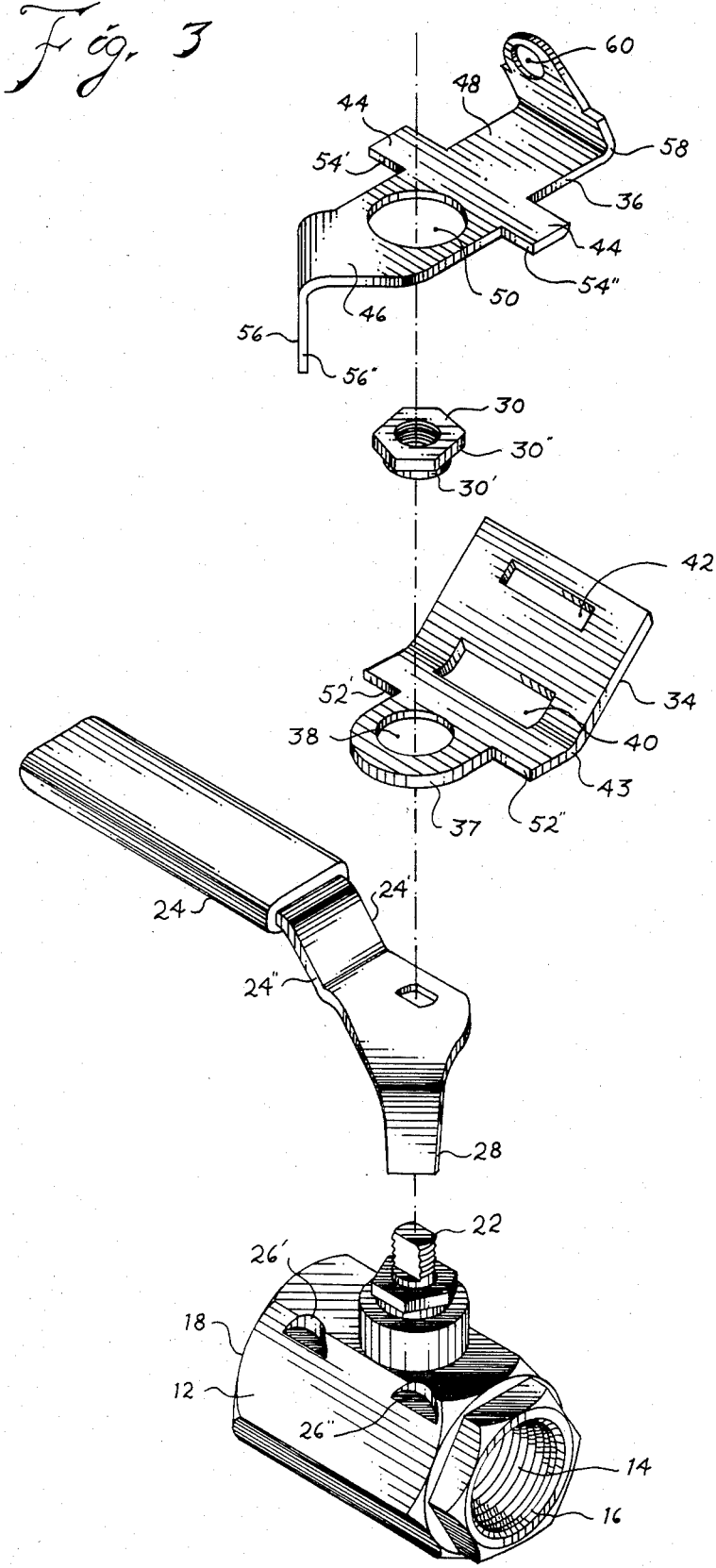
FIG. 3 is an exploded perspective view of the valve and locking apparatus of FIG. 1.

The locking device of the present invention is indicated generally at 32 and basically includes two components, a base member 34 and a locking member 36. As may best be seen in FIG. 3, each of the base member 34 and the locking member 36 are formed as unitary plates, preferably metal, and are cooperatively shaped and configured to interfit for mounting as a unit on the valve 10. The base member 34 is formed predominately square in shape with a rounded arm portion 37 extending from the central portion of one edge thereof. A circular bore 38 is formed centrally through the arm portion 37 of the base member 34 to permit the base member 34 to be mounted about and retained on the stem 22 by the nut 30. The nut 30 is preferably of the conventional type having a cylindrical body portion 30′ and a hexagonal head 30″ and the arm portion 37 of the base member 34 is preferably of a thickness slightly smaller dimensionally than the axial dimension of the cylindrical portion of the nut 30 with the diameter of the bore 38 being slightly larger dimensionally than the diametric dimension of the cylindrical body portion 30′ of the nut 30 whereby the nut 30 may be tightened on the stem 22 to securely retain the base member 34 without restricting the capability of the base member 34 for free and independent rotational swinging about the stem 22. As will be appreciated, the edge portions of the base member 34 which flank either side of the arm portion 37 form a pair of spaced shoulder surfaces 52′,52″ which are thus disposed to be selectively swung into abutment with the handle 24 on respective opposite sides 24′,24″ thereof upon mounting of the base member 34 on the stem 22 in the above-described manner. The base member 34 also includes first and second slots 40,42, respectively, spaced radially outwardly from the rotational axis through the bore 38 and is bent slightly upwardly at 43 generally at the first slot 40 to facilitate the mounting on the base member 34 of the locking member 36, as will hereinafter be explained.

The locking member 36 is generally elongate with a central area of increased width, formed as outwardly extending shoulders 44, from which area oppositely arms 46 and 48. The central area of increased width and a portion of each arm 46,48 extending respectively from adjacent the area of increased width are co-planar with the outward ends of the arms 46,48 being oppositely bent, the outward end of arm 46 extending angularly with respect to the area of increased width and being bent downwardly substantially ninety degrees (90°) with respect to the co-planar portions of the locking member thereby to form a depending leg 56 and the outward end of arm 48 being bent at 58 upwardly and reversely to form a reverse acute angle relative to the co-planar portion of arm 48 and having an aperture 60 formed centrally therein. The arm 48 is of a width slightly less than the first slot 40 of the base member 34 and the slot 40 is of sufficient size to permit the arm 48 to be articulbly inserted through the slot 40.

It will accordingly be understood that, upon assembly of the base and locking members 34,36 in this manner, the shoulders 44 of the locking member 36 will nest in the bend 43 in the base member 34 and the base and locking members 34,36 will be relatively pivotably about an axis extending along the bend 43 for selective relative disposition either with the co-planar portions of the locking member 36 resting on the arm portion 37 and the portion of the base member 34 intermediate the arm portion 37 and the first slot 40 in superposed parallel relation thereto or with such respective portions of the base and locking members 34,36 angularly spaced. To facilitate such superposed disposition of the locking member 36 on the base member 34 when the base member is mounted on the stem 22 of the valve 10 in the above described manner, the co-planar portion of the arm 46 of the locking member 36 is provided with a bore 50 of slightly greater diametric dimension than the hexagonal head 30" of the nut 30 to avoid interference by the nut 30 with the pivotal positioning of the locking member 36. The reverse bend in the extending end of the arm 48 of the locking member 36 and the second slot 42 of the base member 36 are cooperatively arranged for extension of the extending end of the arm 48 through the slot 42 when the locking member 36 is assembled with the base member 34 in the aforesaid superposed disposition. The area of increased width of the locking member 36 is approximately dimensionally equivalent to the portion of the base member 34 intermediate the arm portion 37 and the bend 43 therein whereby the spaced surfaces 54',54" of the shoulders 44 of the locking member 36 facing the bore 50 thereof and the shoulder surfaces 52',52" of the base member 34 cooperate in the superposed disposition of the locking member 36 on the base member 34 to form opposed shoulder surfaces. The depending leg 56 is tapered downwardly to an area of reduced width the opposite edges of which form a pair of engagement surfaces 56',56".

Figure 4:
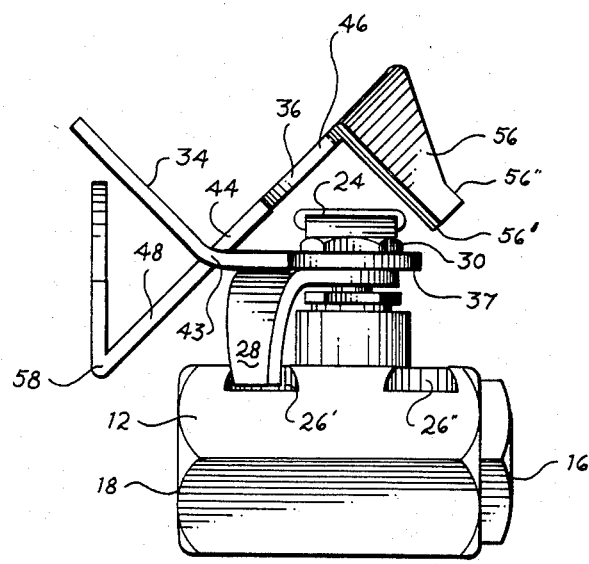
FIG. 4 is a front elevational view of the valve and locking apparatus of FIG. 1 in their relative disposition of FIG. 2, illustrating the locking member of the locking apparatus in its swinging position.
Figure 5:
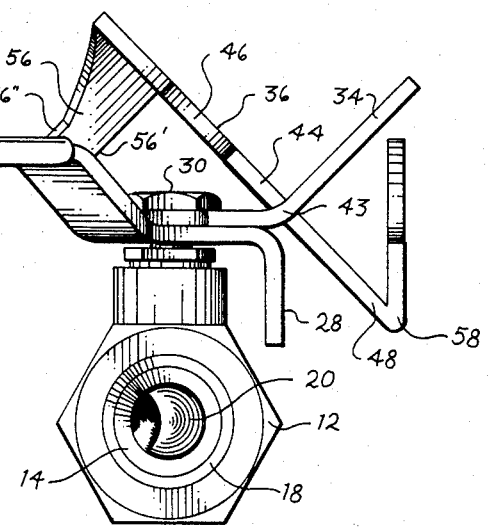
FIG. 5 is a left end elevational view of the valve and locking apparatus of FIG. 1, illustrating the locking member of the locking apparatus in its swinging position and the handle of the valve during movement thereof intermediate its positions of FIGS. 1 and 2.

The mounting of the base and locking members 34,36 on the valve 10 and the operation thereof for selectively locking the valve 10 in either of its two aforedescribed operating dispositions is considered to be apparent from the above description. The base member 34 is initially mounted and secured by the nut 30 on the stem 22 of the valve 10 and the locking member 36 is thereafter mounted on the base member 34 by articulating the arm 48 of the locking member 36 through the first slot 40 of the base member 34, all in the manner hereinabove described. It will be understood that in the aforesaid superposed disposition of the locking member 36 on the base member 34, the shoulder surfaces 52',52",54',54" thereof, respectively, are disposed for abutment with the opposite sides 24',24", respectively, of the valve handle 24 and the engagement surfaces 56',56" of the depending leg 56 of the locking member 36 are disposed for engagement of the valve body 12 (see FIGS. 1 and 2), while, with the locking member 36 in a position pivoted upwardly from the base member 34, the leg 56 is spaced upwardly of the valve body 12 and the base and locking members 34,36 are swingable as a unit about the stem 22 of the valve 10 (see FIGS. 4 and 5). The shoulder surfaces 52',52", and 54',54", and the engagement surfaces 56',56" of the depending leg 56 are respectively operatively arranged on the base and locking members 34,36 in relative association such that, when the valve 10 is in its open position of FIG. 1, the shoulder surfaces 52',54' are adapted to abut the side 24' of the valve handle 24 and the engagement surface 56' of the leg 56 is adapted to simultaneously engage the valve body 10 in the indentation 26' thereof and, when the valve 10 is in its closed position of FIG. 2, the shoulder surface 52",54" are adapted to abut the side 24" of the valve handle 24 and the engagement surface 56" of the leg 56 is adapted to simultaneously engage the valve body 10 in the indentation 26" thereof. When it is desired to lock the valve 10 in one of its two dispositions, i.e. open or closed, the locking member 36 is pivoted upwardly to disposed the base and locking member unit for swinging, the handle 24 of the valve 10 is shifted, if necessary, to the desired position, the base and locking member unit is swung with its locking member 36 in the pivoted condition to bring the appropriate shoulder surface 52',52" of the base member 34 into abutment with the handle 24 intermediate the selected position thereof and the other position thereof, and the locking member 36 is pivoted downwardly to rest on the base member 34 in superposed parallel relation therewith. Upon completion of the just-described steps, the depending leg 56 of the locking member 36 will engage in the indentation 26' and 26" of the valve body 12 not occupied by the leg 28 of the handle 24. Thus, with the valve 10 disposed in the open disposition of FIG. 1, the locking member 36 would be pivoted upwardly, the base and locking member unit would be swung counter-clockwise about the stem 22 until the shoulder surface 52' of the base member 34 abuts the side 24' of the handle 24 and the locking member 36 would be pivoted downwardly into superposed disposition relative to the base member 34, the shoulder surface 54' of the locking member 36 thereby also abutting the side 24' of the handle 24 and the engagement surface 56' of the leg 56, by virtue of the aforesaid operative association thereof with the shoulder surfaces 52',54', engaging the indentation 26' of the body 10. When it is desired to dispose the valve 10 in the closed disposition thereof of FIG. 2, the locking member 36 would again be pivoted upwardly, the handle 24 would be rotated ninety (90°) in a clockwise direction until its leg 28 engages in the indentation 26" of the body 10, the base and locking member unit being swung clockwise by the handle approximately the same arcuate distance, the base and locking member unit would then be swung clockwise approximately an additional one hundred eighty degrees (180°) about the stem 22 until the shoulder surface 52" of the base member 34 abuts the side 24" of the handle 24, and the locking member 36 would be pivoted downwardly into superposed disposition relative to the base member 34, the shoulder surface 54" of the locking member 36 thereby also abutting the side 24' of the handle 24 and the engagement surface 56" of the leg 56, by virtue of its aforesaid operative association with the shoulder surfaces 52",54", engaging the indentation 26" of the body 10.

As will be understood, the slot arrangement by which the base and locking members 34,36 are assembled prevents any relative movement thereof other than pivotal movement of the locking member 36 in a direction normal with respect to the axis of rotation of the valve handle 24 and, accordingly, in both of the dispositions of the base and locking member unit above described (FIGS. 1 and 2), the shoulder surfaces 52',52",54',54" and the depending leg 56 cooperatively restrain rotational movement of the handle 24 about the stem 22. Thus, in the open disposition of the valve 10, the shoulder surfaces 52',54' abut the handle 24 on the side 24' thereof intermediate the open and closed positions of the handle 24 while the engagement surface 56' of the leg 56 faces in the arcuate direction of movement of the handle 24 from its open to closed positions in engagement in the indentation 26' of the valve body 12 on the side thereof opposite the side on which the handle 24 moves between its two positions. In this manner, upon the application to the handle 24 of any force tending to rotate the handle 24 clockwise to its closed position of FIG. 2, the shoulder surfaces 52',54' act to block any such movement of the handle 24 while the engagement surface 56' of the leg 56 engages the opposite side of the valve body 12 to resist the actuation of movement of the base and locking member unit by the force applied to the handle thereby to maintain the shoulder surfaces 52',54' stationary in their handle blocking disposition, the slot arrangement preventing any relative movement of the base and locking members 34,36. As will be understood and appreciated, the shoulder surfaces 52",54" and the engagement surface 56" of the leg 56 perform in the same manner in the closed disposition of the valve 10 (FIG. 2) to resist any arcuate counterclockwise movement of the handle 24 from such closed position to the open position. In this regard it is important to note that the locking device 32 will perform with equal effectiveness in the same manner to prevent movement of the handle 34 when only one of the base member 34 and the locking member 36 is provided with its respective aforedescribed shoulder surfaces and the present invention is not limited to the provision of shoulder surfaces on a specific one or both of the base and locking members 34,36. Additionally, it should be noted that it may be desirable or necessary under certain conditions that the valve 10 be locked when in only one of its two positions and, accordingly, it is contemplated that the locking device 32 may be constructed according to the present invention to be capable only of locking the valve 10 in such one position but not in the other position and any such modified construction of the locking device 32 is considered to be within the scope and substance of the present invention.

The aperture 60 in the outward end of arm 48 of the locking member 36 is adapted to receive a conventional padlock 62 or other suitable selectively displaceable projection to prevent the pivotal movement of the locking member 36 and thereby prevent repositioning of the handle 24 until such is again desired. The locking member 36 is preferably formed of a sufficient thickness to prevent the hexagonal head 30" of the nut 30 from protruding upwardly through the bore 50 when the base and locking members 34,36 are disposed in such locking disposition to effectively prevent the manipulation of the nut 30 and thereby prevent circumvention of the locking unit.

As will thus be appreciated, the locking device 32 of the present invention provides a sturdy structure which is easy to operate and is effective to rigidly lock against inadvertent movement and intentional tampering a flow control valve such as the valve 10 in either its open or closed position, without requiring any special valve construction or the modification of any parts thereof. Furthermore, inasmuch as a substantial proportion of conventional flow control valves employ a stem-actuated valve member to which is attached an operating handle, it will be seen that the present invention may be readily adapted to virtually all such valves. Finally, it is to be noted that the structure of the components of the present invention is relatively simple and inexpensive to produce in that the base and locking members may be readily stamped and bent to the desired respective shapes and configurations.

The present invention has been described in detail above for purpose of illustration only and is not intended to be limited by this description or otherwise to exclude any variation or equivalent arrangement that would be apparent from, or reasonably suggested by the foregoing disclosure to the skill of the art.

I claim:

1. Apparatus for locking a control device of the type having a body and an operating handle mounted thereon for selective shifting between a first and a second position, comprising movable engagement means adapted to be movably mounted on said control device for selective disposition both when said handle is in its said first position and when said handle is in its said second position in simultaneous engagement of said body and said handle to restrain said handle from movement and for selective disengagement in both said positions from at least one of said body and said handle to permit shifting to said handle, said movable engagement means having shoulder means for selective disposition between said first and second positions of said handle and in abutment with said handle, leg means operatively arranged relative to said shoulder means for engaging said body when said shoulder is disposed between said first and second positions of said handle and is in abutment therewith, and means for permitting selective movement of at least one of said shoulder means and leg means relative to the other thereof and generally normal with respect to the shifting movement of said handle for selective positioning of said shoulder means and said leg means for simultaneous abutment of said handle with said shoulder means and engagement of said body with said leg means to prevent movement of said handle and for selective disengaging of at least one of said shoulder means and said leg means from said handle and said body, respectively, to permit shifting of said handle.

2. Apparatus for locking a control device according to claim 1 and characterized further in that said movable engagement means includes a base member adapted to be movably mounted on said body and a locking member mounted on said base member for dependent movement therewith on said body and independent movement relative thereto and generally normal with respect to the shifting movement of said handle.

3. Apparatus for locking a control device according to claim 1 and characterized further in that said movable engagement means includes a base member adapted to be movably mounted on said body and a locking member mounted on said base member for dependent movement therewith on said body and independent movement relative thereto and generally normal with respect to the shifting movement of said handle, said base member having said shoulder means arranged thereon and said locking member having said leg means arranged thereon.

4. Apparatus for locking a control device according to claim 3 and characterized further in that said shoulder means includes a pair of shoulder surfaces arranged in spaced relation on said base member for selective abutment of respective opposite sides of said handle by movement of said base member.

5. Apparatus for locking a control device according to claim 4 and characterized further in that said leg means includes a pair of engagement surfaces arranged on respective opposite sides thereof, each said engagement surface being operatively associated with a respective shoulder surface for engagement of said body upon abutment by said respective shoulder surface with its said respective side of said handle.

6. Apparatus for locking a control device according to claim 5 and characterized further in that said handle is rotatable between its said first and second positions through an arcuate range extending on one side of said body, each said engagement surface of said leg means being disposed to face in the arcuate direction in which said handle is rotatable from the position thereof in which said engagement surface is adapted to lock said handle and each said engagement surface being arranged in relation to its said respective shoulder surface for engagement of said body on the other side thereof when said respective shoulder surface is in abutment with its said respective side of said handle.

7. Apparatus for locking a control device according to claim 3 and characterized further in that said handle is rotatable between its said first and second positions, said base member is adapted to be mounted on said body for independent swinging movement about the axis of rotation of said handle, and said locking member is pivotably mounted on said base member for said independent movement pivotally relative thereto and normal with respect to said axis of rotation, said leg means being arranged on said locking member to move by pivotal movement of said locking member between a locking position in which said leg means is disposed for engagement of said body and a swinging position spaced from said locking position out of disposition for engagement of said body.

8. Apparatus for locking a control device according to claim 7 and characterized further in that said base member includes first slot means and said locking member includes arm means extending through said slot means to facilitate said pivotal movement of said locking member with respect to said base member without disengagement therebetween.

9. Apparatus for locking a control device according to claim 8 and characterized further in that said base member includes second slot means, said arm means having a reverse bend therein adapted for extension through said second slot means upon pivotal movement of said locking member to dispose said leg means in said locking position, said reverse bend having aperture means therein for receiving a projection to prevent relative pivotal movement of said locking member out of locking position with respect to said base member.

10. Apparatus for locking a control device according to claim 1 and characterized further in that said selective movement permitting means includes means operatively connecting said shoulder means and said leg means for said normal movement jointly.

11. Apparatus for locking a control device according to claim 10 and characterized further in that said movable engaging means includes a base member adapted to be movably mounted on said body and a locking member mounted on said base member for dependent movement therewith on said body and independent movement relative thereto and generally normal with respect to the shifting movement of said handle, said locking member having shoulder means and said leg means arranged thereon.

12. Apparatus for locking a control device according to claim 11 and characterized further in that said shoulder means includes a pair of shoulder surfaces arranged in spaced relation on said locking member for selective abutment of respective opposite sides of said handle upon movement of said base member.

13. Apparatus for locking a control device according to claim 12 and characterized further in that said leg means includes a pair of engagement surfaces arranged on respective opposite sides thereof, each said engagement surface being operatively associated with a respective shoulder surface for engagement of said body upon abutment by said respective shoulder surface with its said respective side of said handle.

14. Apparatus for locking a control device according to claim 13 and characterized further in that said handle is rotatable between its said first and second positions through an arcuate range extending on one side of said body, each said engagement surface of said leg means being disposed to face in the arcuate direction in which said handle is rotatable from the position thereof in which said engagement surface is adapted to lock said handle and each said engagement surface being arranged in relation to its said respective shoulder surface for engagement of said body on the other side thereof when said respective shoulder surface is in abutment with its said respective side of said handle.

15. Apparatus for locking a control device according to claim 11 and characterized further in that said handle is rotatable, said base member is adapted to be mounted on said body for independent swinging movement about the axis of rotation of said handle, and said locking member is pivotably mounted on said base member for said independent movement pivotally relative thereto and normal with respect to said axis of rotation, said leg means being arranged on said locking member to move by pivotal movement of said locking member between a locking position in which said leg means is disposed for engagement of said body and a swinging position spaced from said locking position out of disposition for engagement of said body.

16. Apparatus for locking a control device according to claim 15 and characterized further in that said base member includes first slot means and said locking member includes arm means extending through said slot means to facilitate said pivotal movement of said locking member with respect to said base member without disengagement therebetween.

17. Apparatus for locking a control device according to claim 16 and characterized further in that said base member includes second slot means, said arm means having a reverse bend therein adapted for extension through said second slot means upon pivotal movement of said locking member to dispose said leg means in said locking position, said reverse bend having aperture means therein for receiving a projection to prevent relative pivotal movement of said locking member out of locking position with respect to said base member.

18. Apparatus for locking a control device of the type having a body and an operating handle mounted thereon for selective shifting between a first and a second position, comprising movable engagement means adapted to be movably mounted on said control device for selective disposition when said handle is in one of its said first and second positions in simultaneous engagement of said body and said handle to restrain said handle from movement, said movable engagement means having shoulder means for disposition between said first and second positions of said handle and for abutting said handle when said handle is in said one position, leg means operatively arranged relative to said shoulder means for engaging said body when said shoulder means is disposed between said first and second positions of said handle and is in abutment therewith, and means for permitting selective movement of at least one of said shoulder means relative to the other thereof and generally normal with respect to the shifting movement of said handle for selective positioning of said shoulder means and said leg means when said handle is in said one position simultaneously to abut said handle with said shoulder means and to engage said body with said leg means to prevent movement of said handle and for selective disengaging of at least one of said shoulder means and said leg means from said handle and said body, respectively, to permit shifting of said handle.

19. Apparatus for locking a control device according to claim 18 and characterized further in that said movable engaging means includes a base member adapted to be movably mounted on said body and a locking member mounted on said base member for dependent movement therewith on said body and independent movement relative thereto and generally normal with respect to the shifting movement of said handle.

20. Apparatus for locking a control device according to claim 19 and characterized further in that said handle is rotatable between its said first and second positions, said base member is adapted to be mounted on said body for independent swinging movement about the axis of rotation of said handle, and said locking member is pivotably mounted on said base member for said independent movement pivotally relative thereto and normal with respect to said axis of rotation, said leg means being arranged on said locking member to move by pivotal movement of said locking member between a locking position in which said leg means is disposed for engagement of said body and a swinging position spaced from said locking position out of disposition for engagement of said body.

21. Apparatus for locking a control device according to claim 20 and characterized further in that said base member includes first slot means and said locking member includes arm means extending through said slot means to facilitate said pivotal movement of said locking member with respect to said base member without disengagement therebetween.

22. Apparatus for locking a control device according to claim 21 and characterized further in that said base member includes second slot means, said arm means having a reverse bend therein adapted for extension through said second slot means upon pivotal movement of said locking member to dispose said leg means in said locking position, said reverse bend having aperture means therein for receiving a projection to prevent relative pivotal movement of said locking member out of locking position with respect to said base member.

* * * * *